United States Patent
Geaghan

(10) Patent No.: US 8,207,944 B2
(45) Date of Patent: Jun. 26, 2012

(54) CAPACITANCE MEASURING CIRCUIT AND METHOD

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 1182 days.

(21) Appl. No.: 11/612,790

(22) Filed: Dec. 19, 2006

(65) Prior Publication Data

US 2008/0142281 A1 Jun. 19, 2008

(51) Int. Cl.
*G06F 3/044* (2006.01)
*G01R 27/26* (2006.01)

(52) U.S. Cl. ............... 345/173; 178/18.06; 324/678

(58) Field of Classification Search .............. 345/173
See application file for complete search history.

(56) References Cited

U.S. PATENT DOCUMENTS

| | | | |
|---|---|---|---|
| 3,072,849 A | 1/1963 | Firestone |
| 3,617,922 A | 11/1971 | Bernstein |
| 3,983,322 A | 9/1976 | Rodgers |
| 4,029,869 A | 6/1977 | Ingram et al. |
| 4,289,926 A | 9/1981 | Kobayashi |
| 4,289,927 A | 9/1981 | Rodgers |
| 4,353,552 A | 10/1982 | Pepper |
| 4,360,790 A | 11/1982 | Heise |
| 4,455,451 A | 6/1984 | Kriz |
| 4,473,717 A | 9/1984 | Parnell et al. |
| 4,672,154 A | 6/1987 | Rodgers et al. |
| 4,686,332 A | 8/1987 | Greanias |
| 4,786,765 A | 11/1988 | Yamanami et al. |
| 4,848,496 A | 7/1989 | Murakami et al. |
| 4,878,553 A | 11/1989 | Yamanami et al. |
| 4,893,115 A | 1/1990 | Blanchard |
| 4,902,858 A | 2/1990 | Yamanami et al. |
| 4,948,926 A | 8/1990 | Murakami et al. |
| 4,956,526 A | 9/1990 | Murakami et al. |
| 4,988,837 A | 1/1991 | Murakami et al. |
| 4,999,461 A | 3/1991 | Murakami et al. |
| 5,028,745 A | 7/1991 | Yamanami et al. |
| RE33,740 E | 11/1991 | Taguchi et al. |
| RE33,805 E | 1/1992 | Yamanami et al. |
| 5,083,118 A | 1/1992 | Kazama |

(Continued)

FOREIGN PATENT DOCUMENTS

CN 1512345 7/2004

(Continued)

OTHER PUBLICATIONS

U.S. Appl. No. 11/557,829, entitled "Touch Location Sensing System and Method Employing Sensor Data Fitting to a Predefined Curve", filed on Nov. 8, 2006.

(Continued)

*Primary Examiner* — Nitin Patel
*Assistant Examiner* — Dorothy Harris
(74) *Attorney, Agent, or Firm* — Steven A. Bern

(57) ABSTRACT

Disclosed are systems and methods of measuring a plate capacitance, which include accumulating a first signal representative of charge over a plurality of switch-controlled plate charging cycles and accumulating a second signal representative of charge over another plurality of switch-controlled plate discharging cycles. The accumulated first and second signals can then be used to determine the capacitance on the plate. Such systems and methods can be useful in capacitive touch sensing devices such as capacitive buttons and capacitive touch panels.

29 Claims, 8 Drawing Sheets

U.S. PATENT DOCUMENTS

| | | |
|---|---|---|
| 5,122,623 A | 6/1992 | Zank et al. |
| 5,130,500 A | 7/1992 | Murakami et al. |
| 5,138,118 A | 8/1992 | Russell |
| RE34,187 E | 3/1993 | Yamanami et al. |
| 5,191,175 A | 3/1993 | Protheroe et al. |
| 5,194,819 A * | 3/1993 | Briefer ................. 324/684 |
| 5,218,173 A | 6/1993 | Garwin et al. |
| 5,218,174 A | 6/1993 | Gray et al. |
| 5,305,017 A | 4/1994 | Gerpheide |
| 5,337,040 A | 8/1994 | Kind |
| 5,369,227 A | 11/1994 | Stone |
| 5,373,118 A | 12/1994 | Watson |
| 5,374,787 A | 12/1994 | Miller |
| 5,381,137 A | 1/1995 | Ghaem et al. |
| 5,402,151 A | 3/1995 | Duwaer |
| 5,414,227 A | 5/1995 | Schubert et al. |
| 5,420,379 A | 5/1995 | Zank et al. |
| 5,420,804 A | 5/1995 | Tanaka et al. |
| 5,475,401 A | 12/1995 | Verrier et al. |
| 5,486,847 A | 1/1996 | Ranf et al. |
| 5,506,375 A | 4/1996 | Kikuchi |
| 5,528,002 A | 6/1996 | Katabami |
| 5,530,210 A | 6/1996 | Fukuzaki |
| 5,557,076 A | 9/1996 | Wieczorek et al. |
| 5,565,658 A | 10/1996 | Gerpheide et al. |
| 5,571,997 A | 11/1996 | Gray et al. |
| 5,594,215 A | 1/1997 | Jeng |
| 5,608,390 A | 3/1997 | Gasparik |
| 5,619,431 A | 4/1997 | Oda |
| 5,629,500 A | 5/1997 | Fukuzaki et al. |
| 5,633,471 A | 5/1997 | Fukushima |
| 5,644,108 A | 7/1997 | Katsurahira et al. |
| 5,661,269 A | 8/1997 | Fukuzaki et al. |
| 5,675,130 A | 10/1997 | Sekizawa |
| 5,682,019 A | 10/1997 | Katsurahira et al. |
| 5,691,512 A | 11/1997 | Obi |
| 5,691,513 A | 11/1997 | Yamamoto et al. |
| 5,693,914 A | 12/1997 | Ogawa |
| 5,706,000 A | 1/1998 | Fukuzaki et al. |
| 5,714,984 A | 2/1998 | Fukuzaki et al. |
| 5,730,165 A | 3/1998 | Philipp |
| 5,748,110 A | 5/1998 | Sekizawa et al. |
| 5,751,229 A | 5/1998 | Funahashi |
| 5,763,839 A | 6/1998 | Funahashi et al. |
| 5,790,106 A | 8/1998 | Hirano |
| 5,792,997 A | 8/1998 | Fukuzaki |
| 5,793,360 A | 8/1998 | Fleck et al. |
| 5,815,091 A | 9/1998 | Dames et al. |
| 5,861,583 A | 1/1999 | Schediwy et al. |
| 5,898,136 A | 4/1999 | Katsurahira |
| 5,914,708 A | 6/1999 | LaGrange et al. |
| 5,914,710 A | 6/1999 | Chen et al. |
| 5,945,980 A | 8/1999 | Moissev et al. |
| 5,973,677 A | 10/1999 | Gibbons |
| 5,986,646 A | 11/1999 | Chen et al. |
| 6,002,387 A | 12/1999 | Ronkka et al. |
| 6,005,555 A | 12/1999 | Katsurahira et al. |
| 6,020,849 A | 2/2000 | Fukuzaki |
| 6,064,374 A | 5/2000 | Fukuzaki |
| 6,075,468 A | 6/2000 | Sugiyama |
| 6,118,435 A * | 9/2000 | Fujita et al. ............ 345/173 |
| 6,133,906 A | 10/2000 | Geaghan |
| 6,137,427 A | 10/2000 | Binstead |
| 6,178,818 B1 * | 1/2001 | Plochinger ............... 73/304 C |
| 6,215,476 B1 | 4/2001 | Depew et al. |
| 6,249,234 B1 | 6/2001 | Ely et al. |
| 6,307,385 B1 * | 10/2001 | Tardif et al. ............ 324/678 |
| 6,335,727 B1 | 1/2002 | Morishita et al. |
| 6,380,931 B1 * | 4/2002 | Gillespie et al. ........ 345/173 |
| 6,433,781 B1 | 8/2002 | Oda et al. |
| 6,466,036 B1 * | 10/2002 | Philipp .................... 324/678 |
| 6,476,799 B1 | 11/2002 | Lee et al. |
| 6,546,107 B1 | 4/2003 | Bohnke |
| 6,549,096 B2 | 4/2003 | Groves et al. |
| 6,576,850 B2 | 6/2003 | Fukushima et al. |
| 6,587,098 B2 | 7/2003 | Teterwak |
| RE38,286 E | 10/2003 | Flowers |
| 6,667,740 B2 | 12/2003 | Ely et al. |
| 6,670,561 B2 | 12/2003 | Aoki |
| 6,690,156 B1 | 2/2004 | Weiner et al. |
| 6,762,752 B2 | 7/2004 | Perski et al. |
| 6,790,160 B2 | 9/2004 | Kato et al. |
| 6,927,762 B2 | 8/2005 | Lin |
| 6,970,160 B2 | 11/2005 | Mulligan et al. |
| 7,019,672 B2 | 3/2006 | Ely |
| 7,030,782 B2 | 4/2006 | Ely et al. |
| 7,079,118 B2 | 7/2006 | Benard et al. |
| 7,241,954 B2 | 7/2007 | Kanai |
| 7,265,303 B2 | 9/2007 | Thacker |
| 7,411,584 B2 | 8/2008 | Hill et al. |
| 7,436,164 B2 | 10/2008 | Vos |
| 7,453,444 B2 | 11/2008 | Geaghan |
| 7,474,300 B2 | 1/2009 | Katsurahira et al. |
| 7,787,259 B2 | 8/2010 | Free et al. |
| 7,798,272 B2 | 9/2010 | Pruitt et al. |
| 7,812,268 B2 | 10/2010 | Ely |
| 7,907,130 B2 | 3/2011 | Ely |
| 2002/0050983 A1 | 5/2002 | Liu et al. |
| 2003/0001692 A1 | 1/2003 | Chiu et al. |
| 2003/0067447 A1 | 4/2003 | Geaghan et al. |
| 2003/0090347 A1 | 5/2003 | Losehand et al. |
| 2004/0004488 A1 * | 1/2004 | Baxter .................... 324/678 |
| 2004/0092229 A1 | 5/2004 | Hessel |
| 2004/0095333 A1 * | 5/2004 | Morag et al. ............ 345/173 |
| 2004/0104826 A1 | 6/2004 | Philipp |
| 2004/0155871 A1 * | 8/2004 | Perski et al. ............ 345/174 |
| 2004/0233178 A1 | 11/2004 | Silk et al. |
| 2005/0083307 A1 | 4/2005 | Aufderheide et al. |
| 2005/0099188 A1 * | 5/2005 | Baxter .................... 324/678 |
| 2005/0128191 A1 | 6/2005 | Katsurahira et al. |
| 2005/0146513 A1 | 7/2005 | Hill et al. |
| 2005/0162411 A1 | 7/2005 | Berkel van |
| 2005/0171714 A1 | 8/2005 | Ely et al. |
| 2005/0174259 A1 | 8/2005 | Ely |
| 2006/0016800 A1 | 1/2006 | Paradiso |
| 2006/0022959 A1 | 2/2006 | Geaghan |
| 2006/0038628 A1 | 2/2006 | Khannur |
| 2006/0114247 A1 | 6/2006 | Brown |
| 2006/0125472 A1 * | 6/2006 | Howard et al. ......... 324/207.24 |
| 2007/0164833 A1 | 7/2007 | Kottschlag |
| 2007/0176609 A1 * | 8/2007 | Ely et al. ................ 324/678 |
| 2008/0106520 A1 | 5/2008 | Free et al. |
| 2008/0116990 A1 | 5/2008 | Rokhsaz |
| 2008/0128180 A1 | 6/2008 | Perski et al. |
| 2008/0149401 A1 | 6/2008 | Hagen et al. |
| 2008/0149402 A1 | 6/2008 | Vos |
| 2008/0150550 A1 | 6/2008 | Vos |
| 2008/0150658 A1 | 6/2008 | Vos |
| 2008/0150917 A1 | 6/2008 | Libbey et al. |
| 2008/0150918 A1 | 6/2008 | Hagen et al. |
| 2008/0156546 A1 | 7/2008 | Hauck |
| 2008/0158165 A1 | 7/2008 | Geaghan et al. |
| 2009/0040193 A1 | 2/2009 | Geaghan |
| 2009/0134960 A1 * | 5/2009 | Larson et al. ............ 334/78 |
| 2010/0188832 A1 | 7/2010 | Free et al. |

FOREIGN PATENT DOCUMENTS

| | | |
|---|---|---|
| DE | 33 42 522 | 6/1985 |
| DE | 298 19 250 | 1/2000 |
| EP | 0 549 956 A1 | 7/1993 |
| EP | 0 607 694 B1 | 3/2000 |
| JP | 59-014043 | 1/1984 |
| JP | 07-319601 | 12/1995 |
| JP | 08-179871 | 7/1996 |
| JP | 09-046135 | 2/1997 |
| JP | 10-011206 | 1/1998 |
| JP | 11-024830 | 1/1999 |
| JP | 11-073270 | 3/1999 |
| JP | 11-249798 | 9/1999 |
| JP | 2002-007054 | 1/2002 |
| JP | 2002-297300 | 10/2002 |
| JP | 2004-062729 | 2/2004 |
| JP | 2004-185153 | 7/2004 |
| KR | 10-0601151 B1 | 7/2006 |
| KR | 10-0601152 B1 | 7/2006 |
| WO | WO 92/08206 | 5/1992 |
| WO | WO 93/08551 | 4/1993 |

| | | |
|---|---|---|
| WO | WO 96/18171 | 6/1996 |
| WO | WO 02/103622 A2 | 12/2002 |
| WO | WO 2004/021328 A2 | 3/2004 |
| WO | WO 2004/036147 A2 | 4/2004 |
| WO | WO 2004040240 A1 * | 5/2004 |
| WO | WO 2004/070396 A2 | 8/2004 |
| WO | WO 2006/133159 A2 | 12/2006 |

OTHER PUBLICATIONS

Paul Lorrain and Dale Corson, *Electromagnetic Fields and Waves*, 2d ed. W.H. Freeman and Company of San Francisco, CA (1970), pp. 150-152.

* cited by examiner

CAPACITANCE MEASURING CIRCUIT AND METHOD

The present invention relates generally to capacitance measuring circuits and methods, and to systems such as capacitive touch sensing systems that utilize capacitance measuring circuits and methods.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon. In many touch sensitive devices, the input is sensed when a conductive object in the sensor is capacitively coupled to a conductive touch implement such as a user's finger.

SUMMARY OF THE INVENTION

The present disclosure is directed to arrangements, such as circuits, and methods involving determination of a capacitance on a plate. For example, the methods include accumulating a first signal representative of charge over a plurality of switch-controlled charging cycles during which fixed frequency positive voltages are applied to the plate, and accumulating a second signal representative of charge over a plurality of switch-controlled discharging cycles during which fixed frequency negative voltages are applied to the plate. The accumulated first and second signals can then be used to determine the capacitance on the plate.

The present disclosure provides devices for measuring capacitance on a plate. The devices can include two or more switches having open and closed states and disposed so that a first configuration of open and closed states of the two or more switches applies fixed frequency positive voltage to the plate, and a second configuration of open and closed states of the two or more switches applies a fixed frequency negative voltage to the plate. The devices can further include control circuitry disposed to control the two or more switches. The devices can also include one or more signal accumulators disposed to accumulate a first signal representative of the capacitance to be measured during charging of the plate under the first configuration of open and closed states, and to accumulate a second signal representative of the capacitance to be measured during discharging of the plate under the second configuration of open and closed states. In addition, the devices can include measuring circuitry disposed to determine the capacitance to be measured using the accumulated first signal and the accumulated second signal.

The present disclosure provides a capacitive touch panel device that measures capacitance due to a touch input at multiple points on one or more resistive elements to determine the location of the touch. The capacitive touch panel can include a plurality of capacitive measuring devices, each one of the plurality of capacitive measuring devices electrically connected to a different one of the multiple capacitance measurement points. Each capacitive measuring device can be configured and arranged to measure a signal representative of capacitance at its capacitance measurement point under both charging and discharging conditions.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

The present disclosure may be more completely understood and appreciated in consideration of the following detailed description of various embodiments in connection with the accompanying drawings, in which.

Figure 1:
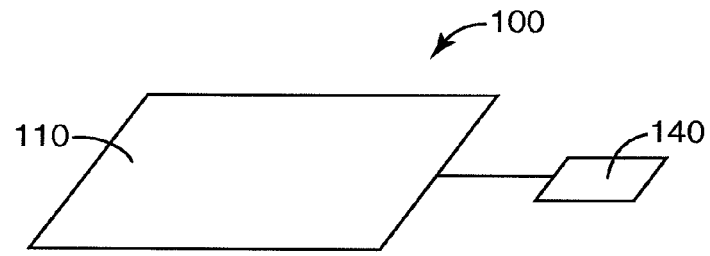
FIG. 1 schematically shows a capacitive touch input device.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present disclosure is generally directed to capacitance measuring circuits that measure capacitance on a plate in a bipolar manner, that is by measuring the capacitance on the plate in both a charging mode (current flowing into the plate) and a discharging mode (current flowing out of the plate). Bipolar measurement provides advantages such as reduced susceptibility to low frequency noise. The present disclosure is further related to bipolar capacitance measuring methods in which the charging and discharging modes are performed using a series of switch-controlled cycles during which a fixed frequency voltage signal is applied. The present disclosure is further related to measuring the number of switch-controlled cycles required to accumulate a signal (e.g., a charge) to a level established by a comparator threshold. In accordance with the present disclosure, the switching and comparator functions can be accomplished using standard parallel input/output (PIO) ports, and the resistance and charge accumulation functionalities can be accomplished using low cost, readily obtained components. The present disclosure also provides capacitance measuring circuits and methods that apply voltages that time-average to zero over an extended time, which can reduce negative effects of material migration and/or electrolysis that can occur in some systems in the presence of a non-zero time-averaged applied voltage. The present disclosure provides enhanced capacitance measuring circuits at a very low cost and that are easily integrated into standard microprocessors, gate arrays, or ASICs.

As will be discussed in more detail with respect to the various embodiments, the circuits and methods for measuring capacitance according to the present disclosure can provide, among other things: enhanced immunity to low frequency noise as compared to single direction, or unipolar, measurement methods; the possibility of symmetrical measurement by alternately charging and discharging through the same components, for example by using reversed cycle sequencing, thereby reducing errors due to mismatched components; and enhanced measurement accuracy and/or reduced time to achieve measurement due to accumulating charge in the charging and discharging modes. Each of these can provide significant advantages over known capacitance measurement circuits depending on desirability and application.

FIG. 1 schematically shows a device 100 for measuring a capacitance on a plate 110. Circuitry 140 is connected to plate 110 and is used to measure the capacitance. Plate 110 can be any suitable conductor, and need not be provided in the form of a two-dimensional or planar surface. Devices for measuring capacitance can take the form of capacitive input (e.g., touch) devices such as buttons and switches, linear sliders, and touch panels, as well as sensors for detecting the presence or amount of a substance positioned proximate the plate. In each of these situations, an unknown capacitance, denoted $C_x$ herein, results from coupling with an object or substance. The present disclosure provides circuitry and methods for measuring $C_x$.

Figure 2:
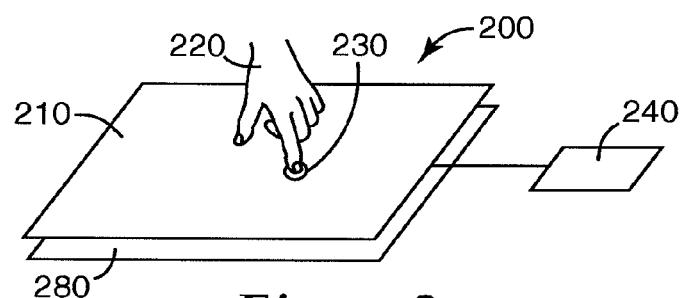
FIG. 2 schematically shows a capacitive touch panel that can optionally be disposed over a display.

FIG. 2 shows one implementation of a capacitance measuring device in the form of a capacitive touch panel 200. Touch panel 200 includes a resistive layer 210, which forms the plate. In many applications, resistive layer 210 can be made of a transparent resistive material so that a display 280 (optional) can be viewed through the touch screen. In other configurations, the touch sensor is a touch pad that is not disposed over a display, allowing the resistive layer to be opaque. Resistive layer 210 is electronically coupled to circuitry 240 for measuring capacitances on resistive layer 210. When a user 220 touches the touch panel at a location 230, the user 220 is capacitively coupled to the resistive layer 210. The capacitance on the resistive layer can be measured at a plurality of pre-defined positions, the capacitance at each position being dependent on its distance from the touch location 230. In this way, the touch location can be determined by known algorithms. Capacitance measuring circuits and methods of the present disclosure can be advantageously used to determine the capacitance at the plurality of positions.

Figure 3:
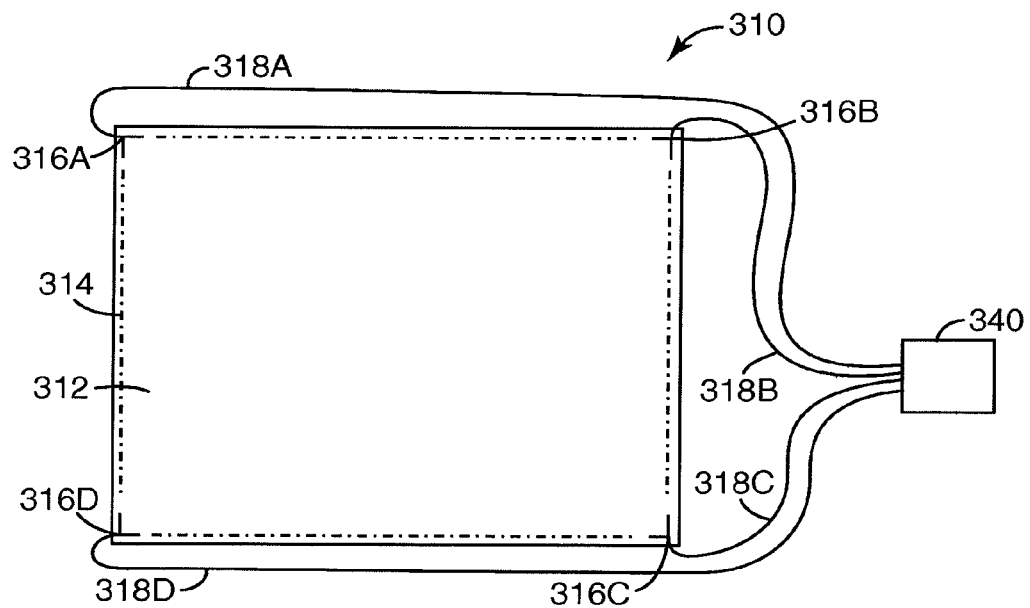
FIG. 3 schematically shows one type of four-wire capacitive touch sensor that may be used with capacitive sensing electronics in accordance with the present disclosure.

Capacitive touch sensors can take many forms, each of which is suitable for use with capacitance measuring circuitry as described in the present disclosure. For example, FIG. 3 shows a traditional analog capacitive touch sensor configuration 310 in which a continuous resistive layer 312 is disposed over an active touch area enclosed by a plurality of electrode segments 314 disposed around the periphery to help uniformly distribute an applied electric field. Communication lines 318A through 318D couple the capacitance measuring circuitry 340 to predetermined positions on the resistive layer 312, typically at the corners 316A-316D. Analog capacitive touch sensors are disclosed in more detail in U.S. Pat. No. 4,353,552, which is hereby incorporated by reference.

Figure 4:
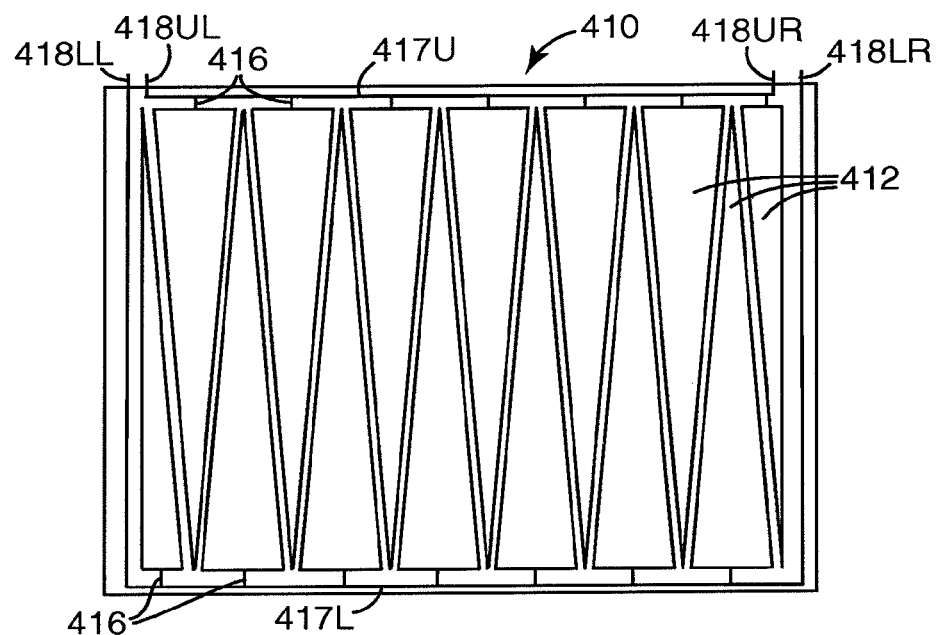
FIG. 4 schematically shows another type of four-wire capacitive touch sensor that may be used with capacitive sensing electronics in accordance with the present disclosure.

FIG. 4 shows an example of a four-wire segmented capacitive touch sensor configuration 410 where the active touch area is tessellated by a series of elongated triangular electrodes 412, forming a kind of "backgammon board" pattern. Each of the electrodes 412 have a connection 416 at their base to one of the common lead lines 417U or 417L, depending on whether the given electrode has its base oriented toward the upper part or the lower part of the sensor as it is shown in FIG. 4. The left and right ends of both the upper and lower lead lines form four communication lines 418LL, 418UL, 418UR and 418LR that can be coupled to measurement circuitry (not shown). The signal from each communication line can be treated in a manner similar to the signals from each of the four corners of an analog capacitive touch screen such as shown in FIG. 3. This and other configurations for a sensor like that shown in FIG. 4 are disclosed in commonly-assigned and co-filed U.S. patent application U.S. Ser. No. 11/612,799 entitled "Touch Sensor with Electrode Array", which is incorporated by reference herein.

Figure 5:
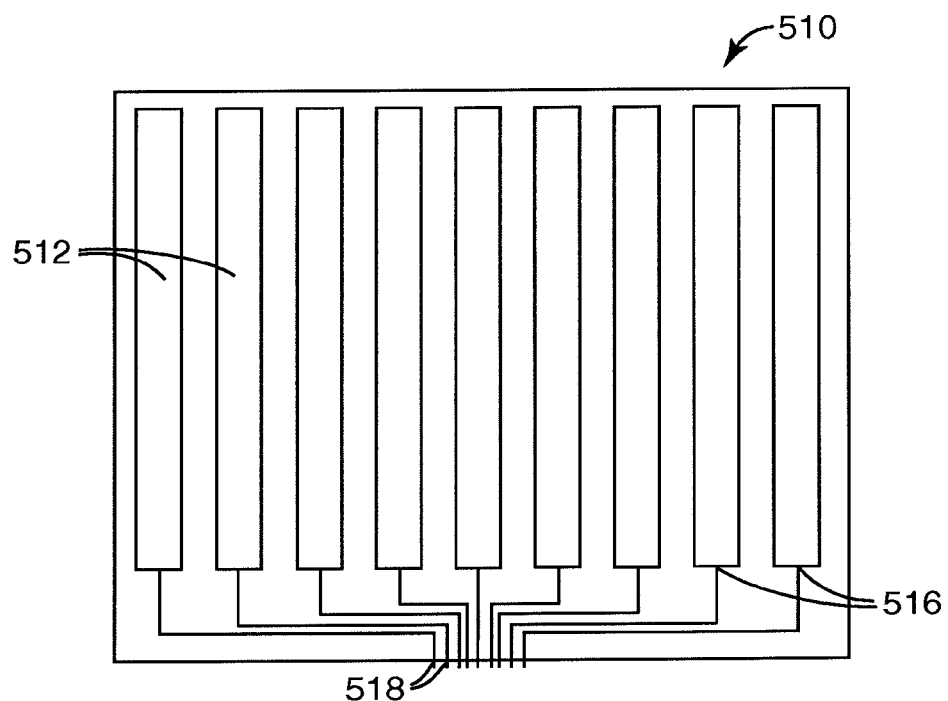
FIG. 5 schematically shows one type of multiple sensing element capacitive touch sensor that may be used with capacitive sensing electronics in accordance with the present disclosure.

FIG. 5 shows an example of a segmented capacitive touch sensor configuration 510 that includes a plurality of electrodes 512 substantially covering an active touch area. Each electrode 512 is connected by lead lines 516 to communications lines 518 that can be coupled to measurement circuitry (not shown). In various configurations, each of the electrodes 512 can have its own dedicated lead line(s), or the lead lines can be arranged to reduce the number of lead lines while still allowing individual electrodes to be distinguished. The configuration shown in FIG. 5 can also be overlapped with a similar plurality of electrodes oriented in a different direction (e.g., orthogonally) in order to create a matrix of x- and y-direction electrodes. Various suitable configurations of segmented capacitive touch sensors are disclosed in U.S. Pat. Nos. 4,686,332; 5,305,017; 5,374,787; 5,790,106; and 6,137,427, which are incorporated by reference herein.

Figure 6A:
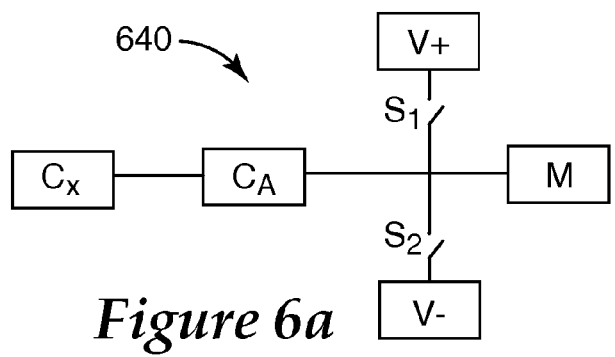
FIGS. 6(a) and 6(b) are schematic block diagrams of capacitive sensing circuits in accordance with the present disclosure.

FIG. 6A schematically depicts the relationship among various components in capacitance measurement circuits of one embodiment of the present disclosure. The circuit 640 includes a capacitance to be measured, $C_x$, a signal accumulator function $C_A$, a positive applied voltage $V_+$ connected to the circuit through a switch $S_1$, a negative applied voltage $V_-$ connected to the circuit through a switch $S_2$, and a measuring unit M. When switch $S_1$ is closed, a positive voltage is applied to the plate capacitance to be measured, $C_x$, and a signal representative of $C_x$ is accumulated in the signal accumulator (s) $C_A$. When switch $S_2$ is closed, a negative voltage is applied to the plate capacitance to be measured, $C_x$, and a signal representative of $C_x$ is accumulated in the signal accumulator (s) $C_A$. Switches $S_1$ and $S_2$ are closed alternately, and signals representative of $C_x$ are accumulated in the signal accumulator(s) $C_A$ over multiple cycles of closing and opening switches $S_1$ and $S_2$. The measuring unit M can measure the accumulated signals by either determining how many cycles are needed to reach a threshold amount of accumulated signal, or by determining the total accumulated signal after completing a set number of cycles. The signal accumulator(s) $C_A$ can represent distinct signal accumulators for each of the charging and discharging paths. For example, $C_A$ can be two separate integrating capacitors, preferably of equal magnitude, one for the charging path, and one for the discharging path.

Figure 6B:
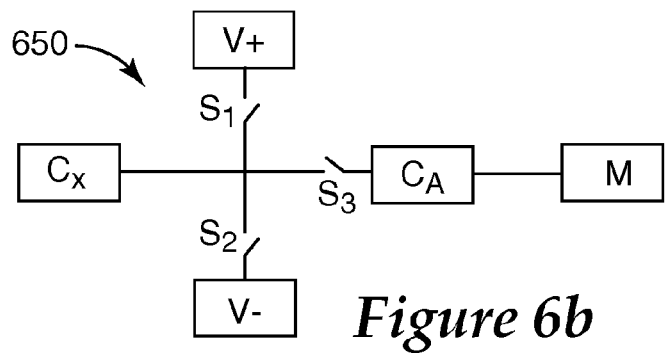

FIG. 6B schematically depicts the relationship among various components in capacitance measurement circuits of another embodiment of the present disclosure. The circuit 650 includes a capacitance to be measured, $C_x$, a signal accumulator function $C_A$, a positive applied voltage $V_+$ connected to the circuit through a switch $S_1$, a negative applied voltage $V_-$ connected to the circuit through a switch $S_2$, a switch $S_3$ connecting $C_A$ with $C_x$, and a measuring unit M. When switch $S_1$ is closed, a positive voltage is applied to the plate capacitance to be measured, $C_x$. Subsequently $S_1$ is opened and $S_3$ is closed, and a signal representative of $C_x$ is accumulated in the signal accumulator(s) $C_A$ over multiple cycles of alternately closing and opening switches $S_1$ and $S_3$. The measuring unit M can measure the accumulated signal by either determining how many cycles are needed to reach a threshold amount of accumulated signal, or by determining the total accumulated signal after completing a set number of cycles. Similarly, discharging cycles can be performed by alternately closing and opening switches $S_2$ and $S_3$. The signal accumulator(s) $C_A$ can represent a single component, or can represent distinct charge accumulators for each of the charging and discharging paths. For example, $C_A$ can incorporate two separate integrating capacitors, one for the charging path, and one for the discharging path.

In circuits and methods of the present disclosure, the charging cycles and discharging cycles can be performed in an interlaced fashion, that is by alternating one or more (but fewer than all) charging cycles with one or more (but fewer than all) discharging cycles, or in a serial fashion, that is by performing all charging cycles before starting the discharging cycles and vice versa. By determining $C_x$ under both charging and discharging conditions, that is in a bipolar fashion, the circuit measures charge transfers to and from $C_x$, thereby largely canceling out low frequency noise, and in particular noise at frequencies below the pulse repetition rate. For example, significant noise sources such as those at or around 60 Hz can be effectively mitigated.

Figure 7:
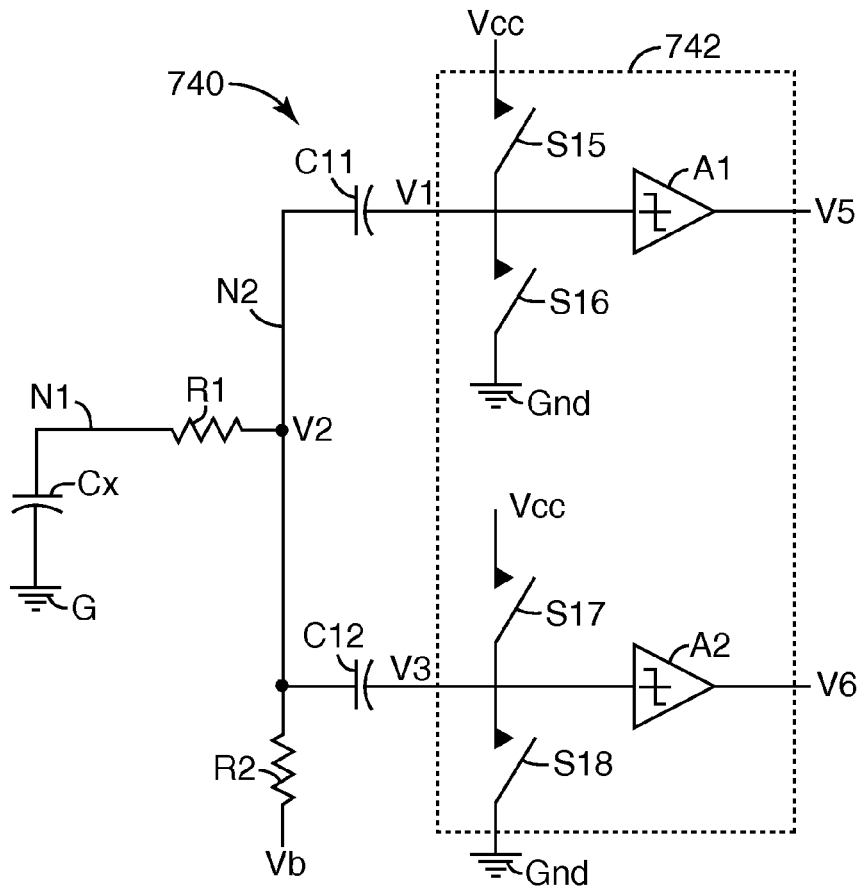
FIG. 7 is a schematic circuit diagram of a capacitive sensing circuit in accordance with the present disclosure.

FIG. 7 shows one embodiment of a circuit 740 for measuring a capacitance $C_x$. Circuit 740 can take advantage of the PIO ports found on low cost, readily available IC chips, making the circuit 740 easy to fabricate and very cost effective. Referring to FIG. 7, switches S15 and S16, and comparator A1 can be provided as components within a first PIO port. Similarly, switches S17 and S18, and comparator A2 can be the components within a second PIO port. Both PIO ports can be provided on a single IC chip. Dashed box 742 in FIG. 7 contains the portions of circuit 740 that are readily available on commercial IC chips (for example, the chips available from Silicon Laboratories under the trade designation C8051F320), with the remaining circuit components being external to the IC chip. Signal accumulators C11 and C12 are shown in FIG. 7 as capacitors external to the PIO ports. C11 and C12 are preferably of nominally equal value so that signal accumulation under both charging and discharging cycles occurs under roughly equivalent conditions. Resistor R1 is a resistor external to the PIO ports that is used to limit the charge and discharge currents to and from the plate (not shown) as well as any electrostatic discharge (ESD) spikes. Resistor R1 may be integrated into the sensing device that includes the plate. Resistor R2 is another resistor external to the PIO ports that can be used to provide a DC bias voltage $V_b$ to the node N2, for example ground or another voltage as described in more detail in discussions that follow. $C_x$ is the plate capacitance to be measured, for example the capacitance to ground from an electrode or conductive layer in a touch sensor.

In the following discussions, the threshold voltage of comparators A1 and A2 ($V_{th}$) is assumed to be about equal to $V_{cc}/2$, which is typical of low cost switching circuits, even though the circuit can operate with other thresholds. Preferably, the thresholds for comparators A1 and A2 are equal and of a magnitude such that the number of charging and discharging cycles required to reach the threshold provide a sufficient signal to noise ratio.

Figure 8:
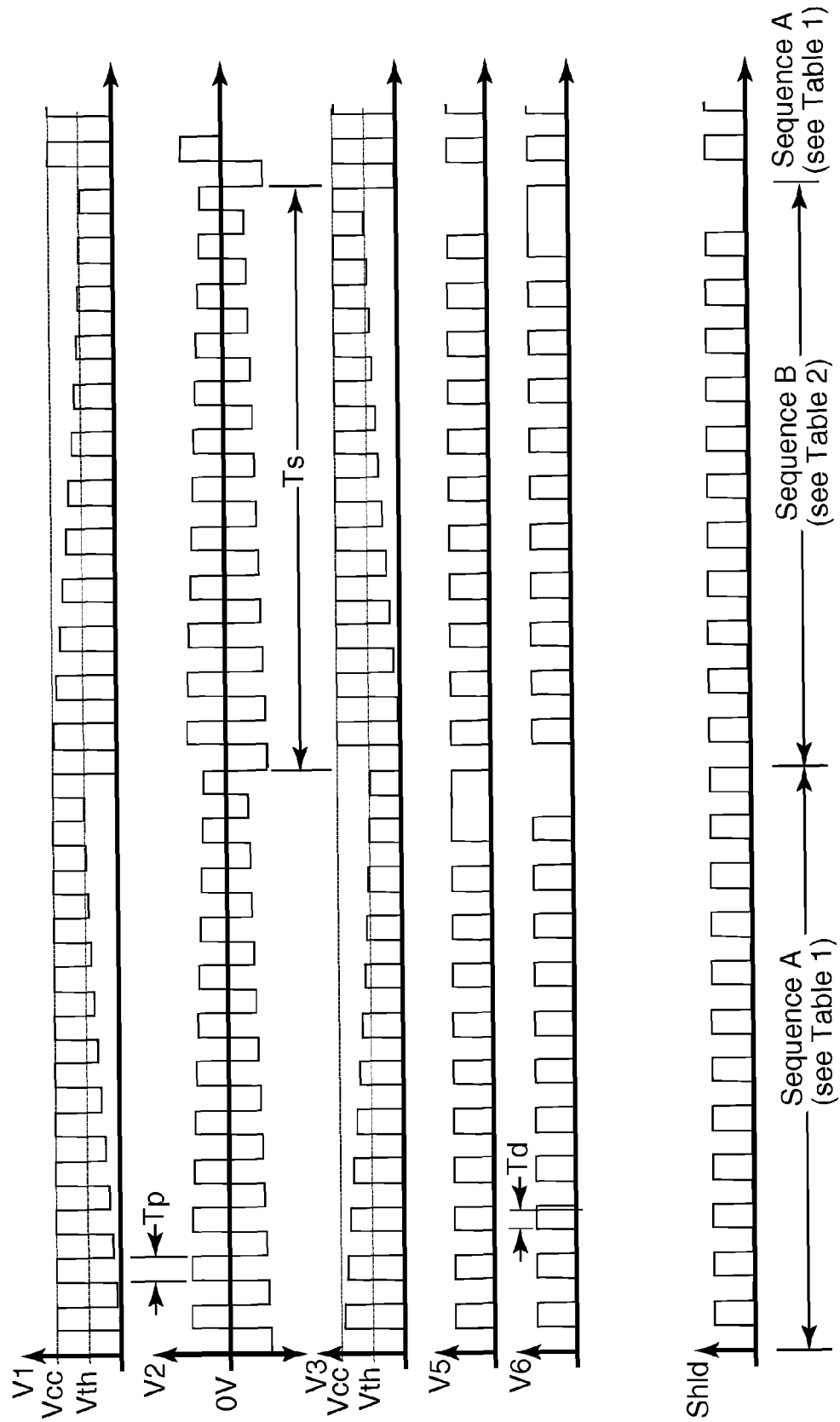
FIG. 8 is a timing diagram showing various applied voltage levels over different sequences of cycles that can be performed during capacitance measurement using capacitive sensing circuits in accordance with the present disclosure.

Measurement of $C_x$ can be performed by transferring charge to and from $C_x$ alternately through C11 and C12. As discussed, the charge transfer cycles can take place in an interlaced fashion. Table 1 indicates an exemplary ordering of charging and discharging cycles, referred to as "Sequence A". In reference to Table 1, Step 1 resets C11 and C12 to 0 V across the series combination of the two capacitors by closing S16 and S18. In Step 2, S15 is closed and C11 and $C_x$ are charged by a positive-going pulse (i.e., current is flowing into the plate). In Step 3, the voltage V6 is sampled to see if the voltage V3 is above the switching threshold of A2. In Step 4, S18 is closed and the charge on $C_x$ is discharged onto C12. When C11 is transferring charge, C12 is floating (S17 and S18 are open). When charge is transferred through C12, C11 is floating. In Step 5, V5 is sampled to determine if V1 is above the switching threshold of A1. Step 2 through Step 5 can be repeated, charging C11 and $C_x$ again, then discharging $C_x$ through C12. Step 2 through Step 5 can be repeated until the combined voltages on C11 and C12 are charged to the threshold switching point, $V_{th}$, of comparator A1 or A2. At that point, the comparator A1 output (previously low during testing) will be high during the test period of Step 5. After a few more cycles, the comparator A2 state (normally high during testing) will also be low during Step 3. The number of charge-discharge pulses required to charge C11 and C12 to this point is approximately inversely proportional to the magnitude of $C_x$. FIG. 8 schematically depicts the various voltage levels during a Sequence A series of charging and discharging cycles.

TABLE 1

| | Sequence A | | | | |
|---|---|---|---|---|---|
| Component | Step 1 Reset 1 | Step 2 Charge | Step 3 Test A2 | Step 4 Discharge | Step 5 Test A1 |
| S15 | open | closed | closed | open | Open |
| S16 | closed | open | open | open | Open |
| S17 | open | open | open | open | Open |
| S18 | closed | open | open | closed | Closed |
| V1 | 0 V | Vcc | Vcc | see FIG. 8 | test if > Vth |
| V2 | see FIG. 8 | see FIG. 8 | see FIG. 8 | see FIG. 8 | see FIG. 8 |
| V3 | 0 V | see FIG. 8 | see FIG. 8 | 0 V | 0 V |
| V5 | low | high | high | ? | test for high |
| V6 | low | ? | test for low | low | Low |

Step 6 is to determine $C_x$. Sequence A loops through Steps 2, 3, 4 and 5 until V5 goes "high". When "high" is detected in Step 5, the number of cycles of Steps 2, 3, 4 and 5 indicates the ratio of $C_x$ to C11 and C12, which in turn can be used to determine the magnitude of $C_x$. V6 will go "low" shortly after V5 goes high (typically one or a few cycles if C11 and C12 are equal). The number of cycles before the V6 low transition to "low" can also be used, alternatively or in combination (e.g. averaged), with the V5 high transition to calculate the value of $C_x$.

Because C11 and C12 may not be perfectly equal, it can be desirable to reverse the process of Sequence A, making the previous charging path into the new discharging path, and the previous discharging path into the new charging path. This reversed sequence, referred to as "Sequence B", is set forth in Table 2. Performing charge/discharge cycles according to Sequence B occurs much like performing charge/discharge cycles under Sequence A. Establishing such mutually reversed sequences that alternate the charge/discharge cycle pathways helps to compensate for differences in magnitude between the components in those pathways, particularly the magnitudes of C11 and C12, through the cycling of residual charge onto the smaller of C11 or C12 after a reset step. While performing such a sequence reversal can be beneficial, it is not required. FIG. 8 schematically depicts the various voltage levels during a Sequence B series of charging and discharging cycles.

TABLE 2

Sequence B

| Component | Step 7 Reset 7 | Step 8 Charge | Step 9 Test A1 | Step 10 Discharge | Step 11 Test A2 |
|---|---|---|---|---|---|
| S15 | open | open | open | open | Open |
| S16 | closed | open | open | closed | Closed |
| S17 | open | closed | closed | open | Open |
| S18 | closed | open | open | open | Open |
| V1 | 0 V | see FIG. 8 | see FIG. 8 | 0 V | 0 V |
| V2 | see FIG. 8 | see FIG. 8 | see FIG. 8 | see FIG. 8 | see FIG. 8 |
| V3 | 0 V | Vcc | Vcc | see FIG. 8 | see FIG. 8 |
| V5 | low | ? | test for low | low | Low |
| V6 | low | high | high | ? | test for high |

Step 12 is to determine $C_x$. Sequence B loops through Steps 8, 9, 10 and 11 until V6 reaches its "high" state. When V6 "high" is detected in Step 11, the number of cycles of Steps 8, 9, 10 and 11 performed to that point can be used to determine the magnitude of $C_x$. V5 will go "low" shortly after V6 goes high. The number of cycles before the V5 transition to "low" can also be used, alternatively or in combination (e.g. averaged), with the V6 high transition to calculate the value of $C_x$.

Optionally, the results of determining $C_x$ in Steps 6 and 12 can be averaged to yield a final result for $C_x$. Preferably, the results of performing multiple A sequences and B sequences can be averaged to yield a better filtered final result for $C_x$.

As discussed, the number of charge-discharge cycles required to charge C11 and C12 to a threshold voltage is approximately inversely proportional to the magnitude of $C_x$. A more precise calculation can also include the fact that the envelopes of V1, V2, and V3 follow an exponential curve. Assuming $V_{th}=\frac{1}{2}V_{cc}=\frac{1}{2}$ of full scale of an exponential function, an incremental change of 1% in $C_x$ results in a measured change of 0.69%. This nonlinearity in the measurement system can be compensated for by a correction algorithm, a look-up table, by moving $V_{th}$, or other known methods that take into account parameters of the measurement circuit.

Referring back to FIG. 7, the following notes can be taken into account when designing an exemplary circuit 740 that is particularly useful in a capacitive touch device:

C11 and C12 are preferably nominally equal, and can be chosen to be much larger than expected for $C_x$. For example, if $C_x$=100 pf, an exemplary choice may be C11=C12=200,000 pf. Such a ratio between $C_x$ and the series combination of C11 and C12 (1000:1) will result in many charge/discharge cycles before V1 and/or V3 reach the A1 or A2 threshold, but can also result in good measurement resolution. A lower ratio of C11 to $C_x$ can be used to reduce measurement time at the expense of resolution. Depending on the level of noise present during measurement, it may be desirable to use a lower capacitor ratio (e.g., 200:1) and regain resolution by averaging multiple A and B sequences rather than measuring fewer high-resolution sequences.

Switch sequences shown in Tables 1 and 2 are preferably break-before-make, that is all switches are preferably opened momentarily between each step.

Resistor R1 can be selected to address several issues. The presence of resistor R1 can reduce ESD susceptibility by limiting ESD current into the measurement circuit. Resistor R1 can also address EMI radiation issues that can arise due to pulsing the circuit at high frequencies and with fast rise/fall times, causing it to radiate excessively. Setting resistor R1 to a high value can reduce EMI by increasing R-C time constants, for example using a 5 KΩ resistor. For EMI reasons, it may be desirable to replace R1 with an inductor, or use R1 in series with an inductor. It should be noted that R1 may not be required in all systems.

Resistor R2 may not be required in all systems, but if it is used R2 preferably has a very high value such as 1 to 2 MΩ. The purpose of R2 is to bias node N2 at a voltage near $V_b$.

The waveforms shown in FIG. 8 have a 50% duty cycle. The pulse duration $T_p$ (see FIG. 8) is dependent on the R-C time constant of resistor R1 and the capacitance to be measured $C_x$. $T_p$ is preferably about 5 or more time constants. Given an expected $C_x$ of about 100 pf and R1=5 KΩ, one time constant equals 500 nanoseconds, so that $T_p$ is preferably about 5 microseconds or greater. Additional time may be desired to ensure break-before-make switching and to test V5 and V6 immediately prior to the next switching step.

Charging of C11 and C12 is exponential, meaning that the measurement of $C_x$ is non-linear. Capacitive measurement often involves detecting a small incremental change in a larger parasitic capacitance, so only incremental linearity is needed. Incremental linearity is marginally better with larger ratios of C11 to $C_x$, for example the 1000:1 ratio discussed above.

Other optional design choices include the following:

It is possible to vary the reset voltage, for example C11 and C12 could be reset to $V_{cc}$ instead of to ground by closing S15 and S17 instead of S16 and S18 in Step 1 and/or in Step 7.

Omitting at least one reset step may have advantages. If Step 7 is omitted, Sequence B, Step 8 will begin with voltage on the series combination of C1 and C12, namely V1−V3=+$V_{th}$. When S17 is closed in Step 8, V3=$V_{cc}$ and V1=$V_{cc}$+$V_{th}$. This voltage will be reduced incrementally with each cycle through Steps 8, 9, 10 and 11 until the combined voltage on C11 and C12 equals V1−V3=−$V_{th}$. At this point, V6 output of A2 will go high during Step 11. Thus, the total voltage range on C11 and C12 goes from +$V_{th}$ to −$V_{th}$ during Sequence B (and would likewise increment back from −$V_{th}$ to +$V_{th}$ during the subsequent Sequence A, if the Step 1 reset is also omitted). In this manner, the voltage range on C11 and C12 is doubled from $V_{th}$ to 2$V_{th}$. This coupled with halving the capacitance of C11 and C12 can double the signal to noise ratio of the measurement system.

There is a caveat to the no-reset method just described. During the first Step 8, V1=$V_{cc}$+$V_{th}$=$V_{cc}$+$V_{cc}$/2. Exceeding $V_{cc}$ at the A1 input may forward bias the protection diodes typically connected to CMOS circuits. This would clip the C11+C12 voltage from $V_{cc}/2$ to $V_f$, which is the value of the diode forward voltage drop. If the clipping is non-damaging to the circuit and if $V_f$ is consistent for every measurement sequence, there may still be a signal to noise advantage to allowing the larger voltage dynamic range on C11 and C12.

The circuit can operate with S17 and A2 removed, using only the Sequence A switching. This will yield a residual charge on C11 or C12, but it still achieves bipolar measurement.

If a capacitance measurement circuit of the present disclosure such as the one shown in FIG. 7 is used with an analog capacitive touch sensor having four corner capacitances to be measured (see FIGS. 3 and 4), a rear shield can be added to the sensor to reduce noise. Driving the rear shield with a voltage equal to the measurement voltages can also reduce the apparent parasitic capacitance of the touch sensor, as measured at the four corners. The shield drive signal can be a constant signal that switches synchronously with V1 and V2 (i.e., a square wave like V5 and V6 in FIG. 8), or can preferably vary over each switching sequence, approximately matching signal V2. To drive the rear shield, a buffer amplifier could be connected between V2 and the shield, or a constant shield drive signal could be generated from a single PIO, connected to the shield through a capacitor, or a variable rear shield drive can be made using two additional PIO ports configured similarly to circuit 740 in FIG. 7 (with $C_x$ representing the capacitance of shield to ground). If this is done, the apparent parasitic capacitance of the four corner circuits can be reduced significantly, allowing lower values of C11 and C12 to be used. This would have the effect of increasing resolution, since the proportion of touch capacitance to parasitic capacitance would be larger. The values of C11 and C12 in the shield drive circuit would be larger than C11 and C12 used for corner measurement, in proportion to the difference in parasitic capacitance of shield versus each corner. If this proportion is exact, then the shield drive signal will match the corner signals.

Circuits of the present disclosure can be used to measure plate capacitance due to coupling with a static conductive object (such as a user's finger on a capacitive touch screen) or with a driven object (such as a signal driven stylus on a capacitive touch screen). As an example, circuit 740 of FIG. 7 can be used to measure signals from a stylus on a touch sensor. When used for stylus input, switches S15 and S17 are not required, or can remain open for the whole measurement sequence, because the stylus provides the signal.

Figure 9:
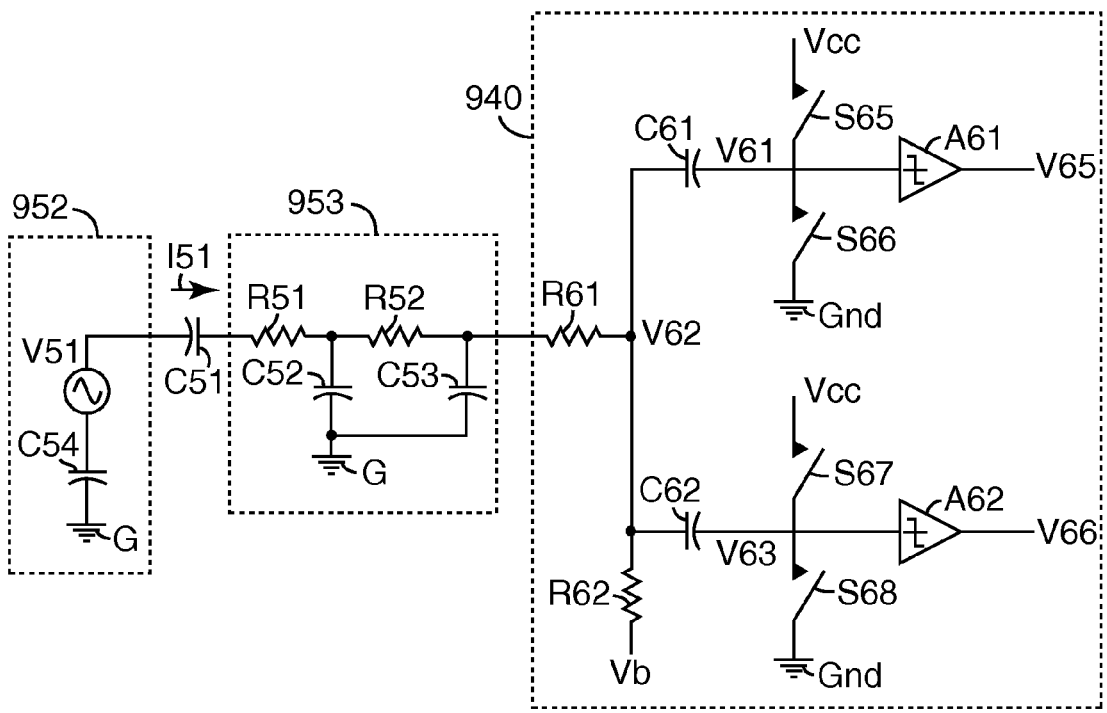
FIG. 9 is a schematic circuit diagram of a capacitive sensing circuit in accordance with the present disclosure.

FIG. 9 shows circuit 940, which has substantially the same components as circuit 740 in FIG. 7, plus circuit 940 includes an AC active touch source 952. Touch source 952 includes a voltage source V51 and a source-to-ground capacitance C54. Voltage from source V51 couples to sensor electrode 953 through coupling capacitance C51. Touch source 952 can be any suitable device such as the driven electrode of a shunt capacitance system (e.g., a capacitive button sensor with a driven portion and a passive portion, where the touch object bridges the gap, passing the signal from the driven portion to the passive portion), or an active stylus (such as often provided with a tablet PC), or a voltage-activated finger (such as disclosed in commonly assigned published patent application US20060022959, incorporated by reference herein). An active stylus may be tethered to a power source, battery powered using methods known in the art, or it may be powered by magnetically coupling energy from a coil within proximity of the stylus, for example as disclosed in commonly assigned U.S. patent application U.S. Ser. No. 11/557,829.

Sensor electrode 953 can be approximated by resistors R51 and R52 which represent (lumped for simplicity) distributed resistance across electrode 953. C52 and C53 represent (lumped for simplicity) capacitance that is distributed across electrode 953. Current coupled from touch source 952 through capacitance C51 to electrode 953 can be measured by circuit 940, where switches S66 and S68 open and close alternately and synchronous with voltage V51, such that circuit 940 operates as a full-wave synchronous demodulator.

Measurement of source V51 can be performed in a bipolar manner as discussed above, preferably using two different sequencings of steps in the cycles so that each signal accumulator, C61 and C62, is used in charging and discharging cycles, much as described above. For example, a first sequence of steps can be as follows. Step 1: circuit 940 is first reset by closing switches S66 and S68 simultaneously to discharge C61 and C62. Step 2: during a rising half cycle (Tr) of voltage V51 (V51 is a sinusoidal AC source), S68 is closed and S66 is open. A portion of current I51 flows through C51, R51, R52 and R1, and then through C62 and S68 to ground, accumulating positive charge (and thus positive voltage) on C62. Other portions of I51 flow through parasitic capacitances C52 and C53 to ground. Step 3: V65 is sampled to determine if V61 exceeds the switching threshold of A61. Step 4: during the subsequent falling half cycle (Tf) of V51, S68 is open and S66 is closed. A portion of current I51 flows through C51, R51, R52 and R61, and then through C61 and S66 to ground, accumulating negative charge (and thus negative voltage) on C61. Other portions of I51 flow through parasitic capacitances C52 and C53 to ground.

The sequence is carried on by repeating steps 2 through 4 during subsequent cycles of V51 until the combined voltages on C61 and C62 build up to equal the voltage threshold voltage of A61. The output V65 from A61 is measured at the end of each half cycle that S68 is closed. When V65 goes high (and S68 is closed) the number of cycles required to charge C61 and C62 to the threshold are tallied, and this total is inversely proportional to the magnitude of the capacitive coupling between source 952 and sensor electrode 953.

After this first sequence is executed, a second sequence can be executed that is the same sequence of steps but with the roles of C61/S66 and C62/S68 reversed. S68 is closed during Tf, and S66 is closed during Tr. During the test step, voltage V66 is sampled rather than V65. Alternating these first and second sequences is not necessary, but it can reduce errors that may otherwise result from differences in magnitude of C61 and C62, and/or differences between parameters of A61 and A62.

Voltage V51 is preferably more than ten times greater in magnitude than $V_{cc}$. The frequency of V51 is preferably between 50 KHz and 5 MHz. C54 is preferably at least an order of magnitude greater than the expected source-to-sensor coupling capacitance C51. C61 and C62 are preferably equal, and are preferably one thousand times greater than C51. S66 and S68 are preferably MOSFET switches with break-before-make switch timing, and switching times less than 1/10 of the period of the AC waveform of V51. A61 and A62 are comparators with switching times preferably less than 1/10 of the period of the AC waveform of V51. Switches S65, S66, S67 and S68 preferably operate with bipolar voltages applied. R61 is preferably less than 5 KΩ, and R62 is preferably greater than 1 MΩ. R51, R52, C52 and C53 preferably have the lowest possible values.

Figure 10:
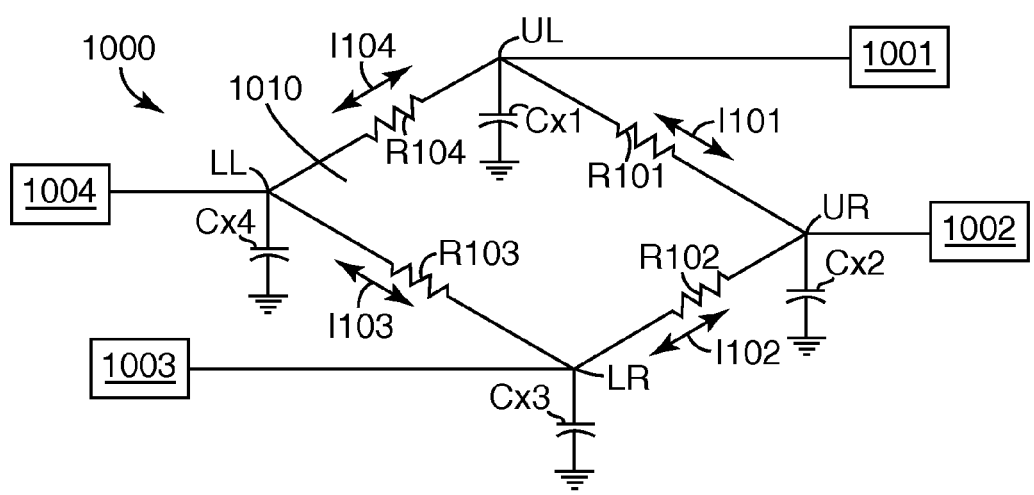
FIG. 10 schematically shows a four-wire capacitive touch sensor including a capacitive sensing circuit of the present disclosure for each of the four capacitances to be measured.

FIG. 10 shows system 1000 that includes measurement systems 1001 through 1004 connected to an analog capacitive touch sensor 1010 at the four corners UL, UR, LL and LR. Sensor 1010 is represented by a simplified schematic having lumped distributed capacitances Cx1, Cx2, Cx3 and Cx4, and corner-to-corner resistances R101, R102, R103 and R104. Measurement systems 1001 through 1004 may be any of the capacitance measurement circuits described herein.

If the signals generated at UR, UL, LR and LL by systems 1001 through 1004 match perfectly, currents I101 through I104 flowing from one corner to another through resistances R101, R102, R103 and R104 will be zero. As such, circuits 1001 through 1004 will measure capacitances Cx1, Cx2, Cx3 and Cx4 respectively, as described previously. If voltages at UL, UR, LR and LL do not match, currents I101 through I104 will pass through R101 through R104, reducing the accuracy of Cx1 through Cx4 measurements.

Figure 11:
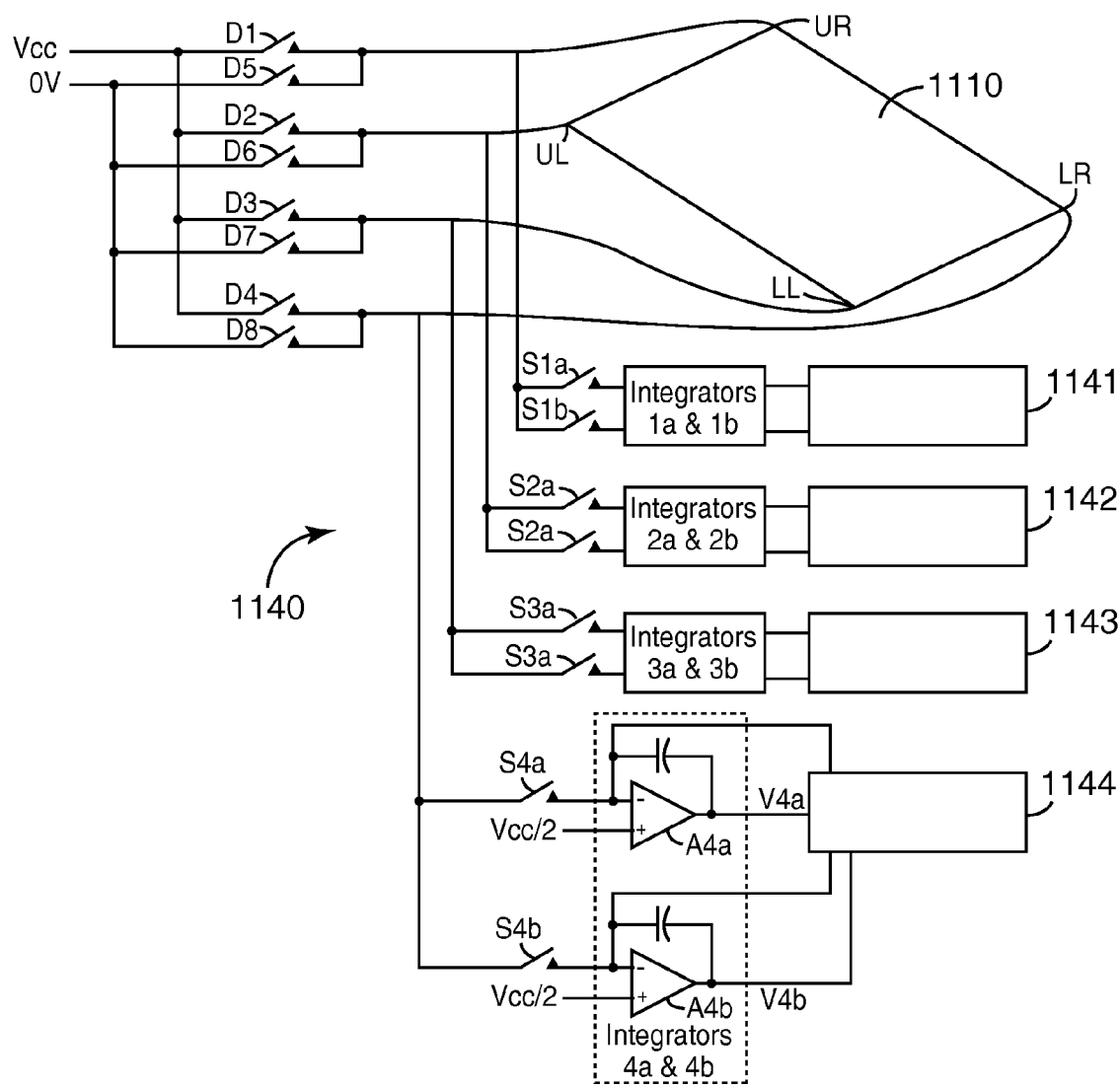
FIG. 11 schematically shows a four-wire capacitive touch sensor including a capacitive sensing circuit of the present disclosure for each of the four capacitances to be measured.

FIG. 11 shows a capacitance measuring system 1140 that includes four capacitance measuring circuits of the present disclosure for measuring charge/discharge cycles on each of the four channels of a four wire capacitive touch sensor 1110. The circuits of system 1140 are somewhat more complex than the circuit 740 shown in FIG. 7, but they have the advantage that all voltages applied to sensor 1110 (at corners UL, UR, LL and LR) are substantially identical, therefore minimizing any inter-circuit currents (currents flowing from one corner to another of sensor 1110). System 1140 includes four identical circuits of the present disclosure, one of which is shown in greater detail for illustration.

Operation of the circuits in system 1140 can proceed according to the following steps. Step 1: all sixteen switches (S1a, S1b, S2a, S2b, S3a, S3b, S4a, S4b and D1 through D8) are opened. Step 2: switches D1 through D4 are closed, applying $V_{cc}$ to the conductive touch surface of touch sensor 1110. If sensor 1110 has relatively low resistance between UL, UR, LL and LR, only one of the four switches (for example, switch D1) is required. Step 3: switches D1 through D4 are opened, leaving sensor 1110 and any touch capacitance, if present, charged to $V_{cc}$. Step 4: switches S1a, S2a, S3a and S4a are closed simultaneously, allowing current from corners UR, UL, LL and LR of sensor 1110 to accumulate in integrators 1a, 2a, 3a and 4a respectively. Step 5: switches S1a, S2a, S3a and S4a remain closed for a time period T (for example, five R-C time constants) to allow charge to transfer from sensor 1110 to the integrators. Step 6: the eight switches S1a, S1b through S4a, S4b are opened. Step 7: switches D5 through D8 are closed to apply 0 V to the conductive touch surface of touch sensor 1110. If sensor 1110 has relatively low resistance between UL, UR, LL and LR, only one switch (for example, switch D5) is required. Step 8: switches D5 through D8 are opened, leaving sensor 1110 and any touch capacitance, if present, charged to 0 V. Step 9: switches S1b, S2b, S3b and S4b are closed simultaneously, allowing current from each corner of sensor 1110 to accumulate in integrators 1b, 2b, 3b and 4b. Step 10: switches S1b, S2b, S3b and S4b remain closed for a time period T (for example, five R-C time constants) to allow charge to transfer from sensor 1110 to the integrators. These steps 1 through 10 can be repeated for a predetermined amount of time or for a predetermined number of cycles. Each cycle through the steps charges integrators 1a through 4a in a negative direction, and charges integrators 1b through 4b in a positive direction.

The differences between the integrator outputs can be measured and/or calculated for each of the four integrators. For example, V4b and V4a may be accumulated on analog integrators, then converted to digital values by A/D converter 1144, then the value V4b-V4a may be found by digital subtraction. Alternatively, the A/D converters 1141 through 1144 may be sigma delta converters (or pairs of sigma delta converters) with the integrators 1a, 1b through 4a, 4b serving only as front ends, with the main integration being done digitally. The four determined values may be filtered and used to calculate a touch position on sensor 1110 using known algorithms. While FIG. 11 shows charging of sensor 1110 to $V_{cc}$ and 0 V with an integrator reference of $V_{cc}/2$, it is recognized that other voltages may be used.

Operation of system 1140 is bipolar in that voltages applied to sensor 1110 alternate between +V (positive with respect to reference $V_{cc}/2$) and -V (negative with respect to reference $V_{cc}/2$), and currents flowing out of sensor 1110 are measured alternately with currents flowing into sensor 1110. As previously discussed, such bipolar operation increases noise immunity, especially in the presence of low frequency noise. The capacitive touch sensor controller commercially available from 3M Touch Systems, Inc. under the trade designation SMT3 functions on a similar basis as the system 1140, but the SMT3 controller is not bipolar. The SMT3 circuit has four integrators and integrator switches, and four switches that apply only a single voltage polarity to the sensor so only those current pulses flowing from sensor are measured.

Figure 12:
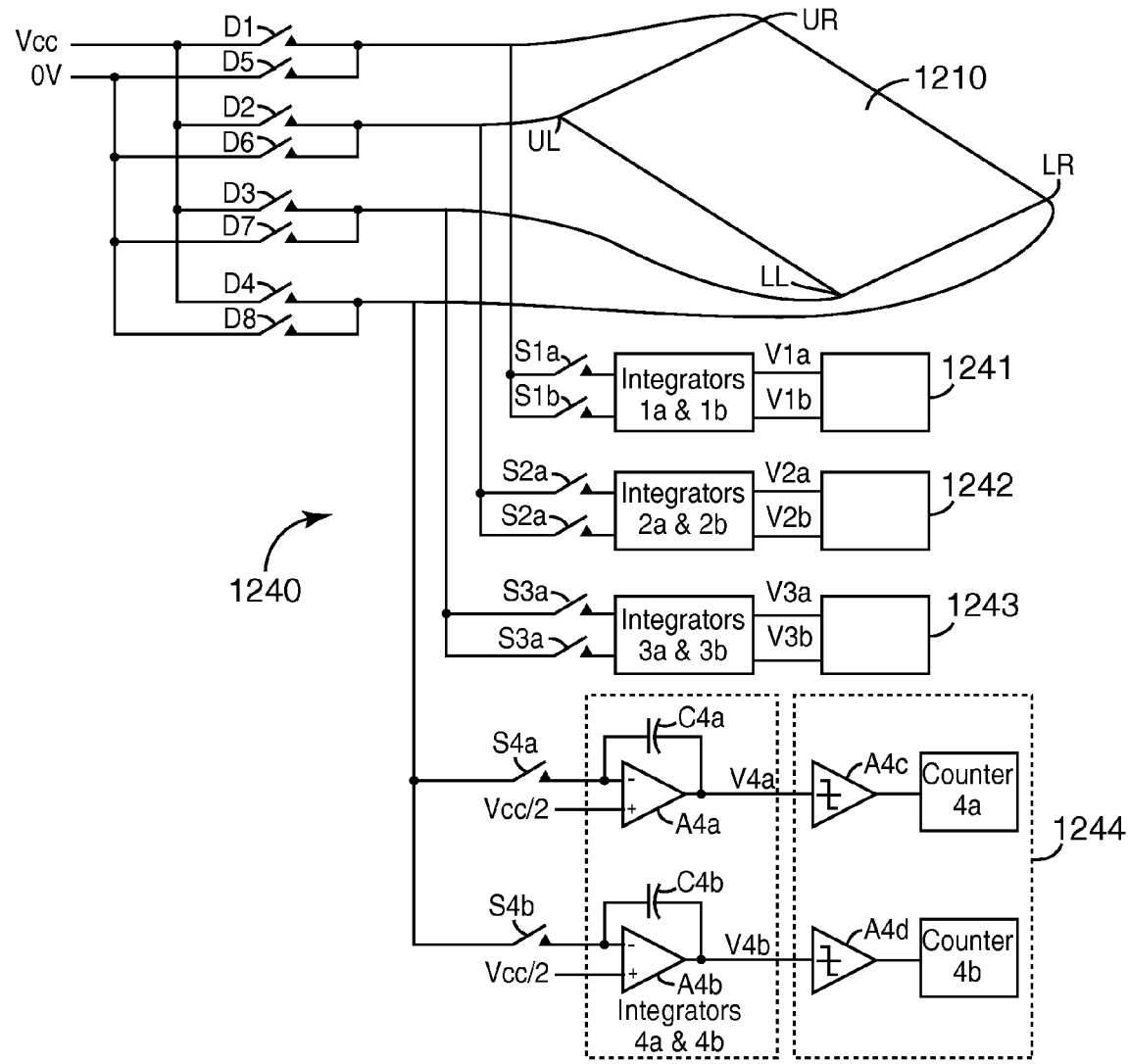
FIG. 12 schematically shows a four-wire capacitive touch sensor including a capacitive sensing circuit of the present disclosure for each of the four capacitances to be measured.

FIG. 12 shows system 1240, which includes four identical circuits of the present disclosure, one of which is shown in greater detail for illustration. System 1240 is similar to system 1140, except that the measurement circuit of A to D converters 1241 through 1244 are replaced with pairs of simple threshold comparators A1c, A1d through A4c, A4d and pairs of counters 1a, 1b through 4a, 4b. Instead of integrating and measuring a fixed number of pulses as in circuit 1140, integrators 1a, 1b through 4a, 4b accumulate charge during whatever number of pulses are required for each integrator to reach the threshold of their associated comparators, A1c, A1d through A4c, A4d. In this respect, system 1140 is similar to system 740 shown in FIG. 7.

The circuits of system 1240 have the following features:
  Integrator amplifier pairs A1a, A1b through A4a, A4b have inputs and outputs capable of operating rail-to-rail, which is a common type in the industry.
  The positive inputs of the eight integrating differential amplifiers A1a, A1b through A4a, A4b are at Vcc/2 volts, so summing junctions at the negative inputs of A1a, A1b through A4a, A4b operate at Vcc/2 volts.
  Switching thresholds of the eight comparators A1c, A1d through A4c, A4d are at Vcc/2 volts.

System 1240 can be operated as follows.

In an initialization phase: switches S1a, S1b through S4a, S4b, and D1 through D8 are opened; counters 1a, 1b through 4a, 4b are reset to zero; integrators 1a, 2a, 3a and 4a are initialized by circuits (not shown) with charge on capacitors C1a, C2a, C3a and C4a such that outputs V1a, V2a, V3a and V4a are at approximately +Vcc volts; integrators 1b, 2b, 3b and 4b are initialized by circuits (not shown) with charge on capacitors C1b, C2b, C3b and C4b such that outputs V1b, V2b, V3b and V4b are at approximately 0 volts; and the states of comparators A1a, A1b through A4a, A4b are stored.

An accumulation and measurement phase can then be conducted. Switches D1 through D4 are closed, applying Vcc to the conductive touch surface of touch sensor 1210. If sensor 1210 has relatively low resistance from corner to corner, only one of the four switches (e.g., D1) is needed. Switches D1 through D4 are then opened, leaving sensor 1210 and any touch capacitance, if present, charged to Vcc. Switches S1a, S2a, S3a and S4a are closed simultaneously, allowing charge from each corner of sensor 1210 to accumulate in capacitors C1a through C4a of integrators 1a, 2a, 3a and 4a. Switches S1a, S2a, S3a and S4a remain closed for a time period T (e.g., five R/C time constants) to allow charge to transfer from sensor 1210 to integrator capacitors C1a, C1b through C4a, C4b. Counters 1a through 4a are incremented, and the states of comparators A1c, A2c, A3c and A4c are measured. If any of comparator(s) 1a, 2a, 3a or 4a have changed state, the value of its attached counter is stored and no further counting is performed until after the next initialization.

The eight switches S1a, S1b through S4a, S4b are then opened. Switches D5, D6, D7 and D8 apply 0 V to the conductive touch surface of touch sensor 1210. If sensor 1210 has relatively low resistance from corner to corner, only one switch (e.g., D5) is needed. Switches D5 through D8 are opened, leaving sensor 1210 and any touch capacitance, if present, charged to 0 V. Switches S1b, S2b, S3b and S4b are closed simultaneously, allowing current from each corner of sensor 1210 to accumulate in integrators 1b, 2b, 3b and 4b. Switches S1b, S2b, S3b and S4b remain closed for a time period T (e.g., five time constants) to allow charge to transfer from sensor 1210 to the respective integrators. Counters 1b, 2b, 3b and 4b are incremented. The states of comparators A1d, A2d, A3d and A4d are measured. If any of comparator (s) 1b, 2b, 3b or 4b have changed state, the value of its attached counter is stored and no further counting is performed until after the next initialization.

The accumulation and measurement phase steps can be repeated, resulting in integrators 1a, 2a, 3a and 4a charging in a negative direction from Vcc, and integrators 1b, 2b, 3b and 4b charging in a positive direction from 0V. As each integrator output reaches the threshold of its respective comparator (i.e., A1a, A1b, A2a, A2b, A3a, A3b, A4a or A4b), its attached comparator switches. Repetition continues until all eight comparators (A1c, A1d through A4c, A4d) have outputs that have switched relative to their state at the end of the initialization phase. At this point, the eight counters 1a, 1b through 4a, 4b have stored values representing the number of charge transfers required to bring each integrator to the threshold level.

After completing the accumulation and measurement phase, a calculation phase can be performed. In the calculation phase, values in the counters can be combined to calculate the relative capacitance of the four corners of sensor 1210. For example, values in pairs of counters 1a and 1b, 2a and 2b, etc. can be summed to yield four values, each of which is inversely proportional to the capacitance at one of the four corners of sensor 1210. These four values can be filtered and used to calculate a touch position on sensor 1210, using known algorithms.

As will be appreciated, system 1240 is an example, and many alternative configurations may be utilized to achieve similar results depending on various factors. For example, amplifiers A1a, A1b through A4a, A4b may be referenced to ground instead of Vcc/2. The thresholds of comparators A1c, A1d through A4c, A4d may be at 0V, Vcc, or any level between. Counters 1a, 1b through 4a, 4b may be replaced by a microprocessor running a counting algorithm to handle all comparators. Four channels may be connected to corners of a sensor as shown, or more than four channels may be attached to other points on a sensor. A single channel may be used to measure capacitance of a button, or two channels may be used to measure capacitances of a two-dimensional slider, or three or more channels may be used to measure capacitances of a scroll wheel.

Examples above use two charge accumulator capacitors per channel to perform alternating bipolar measurement. It is also possible to perform bipolar measurements with one signal accumulator. Rather than alternately sampling current during charging modes onto one accumulator and measuring discharging modes on a separate signal accumulator, a quantity of charging current cycles can be sampled on a signal accumulator, which can then be measured and re-initialized so that a quantity of discharge current cycles can be measured with the same signal accumulator and measurement circuit.

Figure 13:
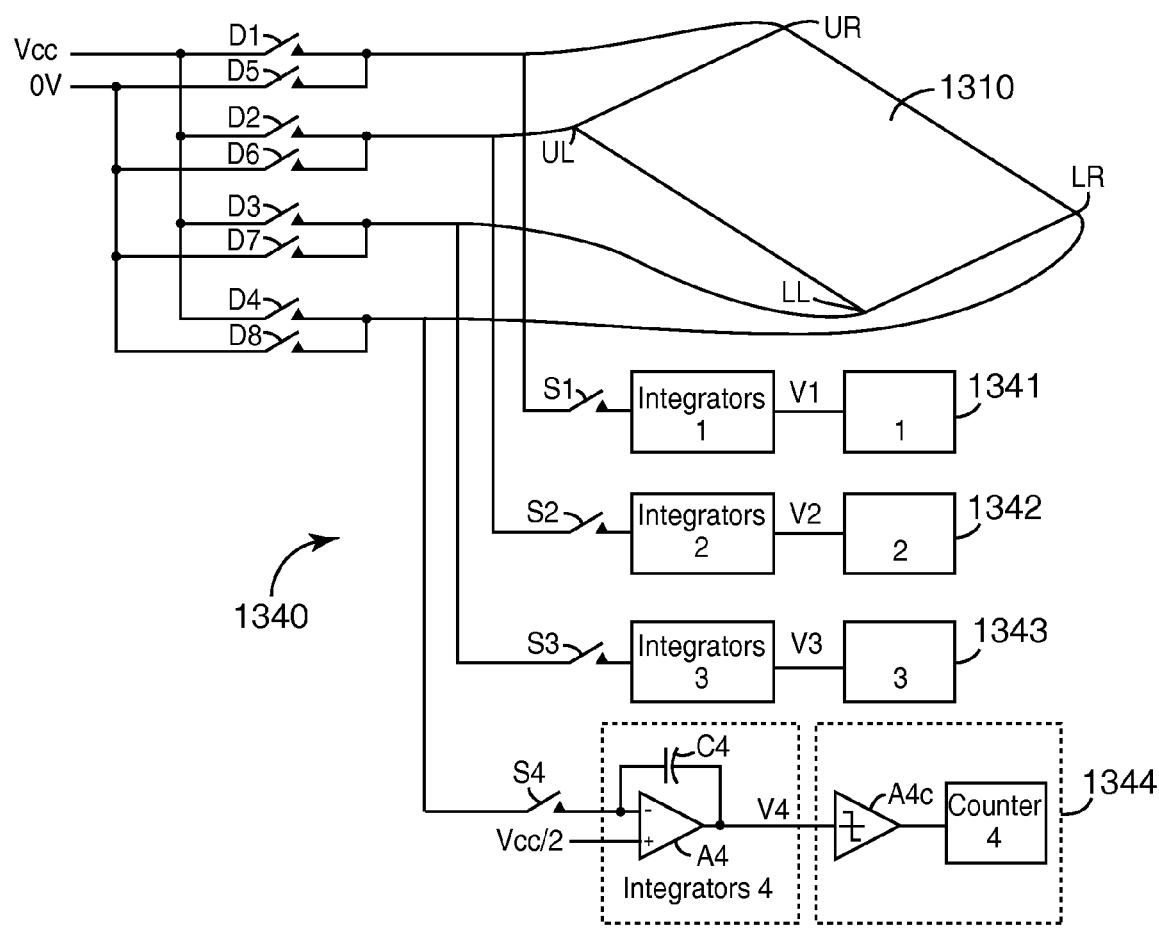
FIG. 13 schematically shows a four-wire capacitive touch sensor including a capacitive sensing circuit of the present disclosure for each of the four capacitances to be measured.

FIG. 13 shows system 1340 which includes four identical circuits of the present disclosure, one of which is shown in greater detail for illustration. System 1340 is similar to system 1240, except that the eight charge accumulator integrators of system 1240 are replaced by four charge accumulator integrators 1 through 4, and measurement is accomplished by threshold comparators A1c through A4c and counters 1 through 4. Integrator amplifiers 1 through 4 have inputs and outputs capable of operating rail-to-rail, which is a common type in the industry. The positive inputs of the four integrating differential amplifiers A1 through A4 are at Vcc/2 volts, so summing junctions at the negative inputs of A1 through A4 operate at Vcc/2 volts. Switching thresholds of four comparators A1 through A4 are at Vcc/2 volts.

Operation of system 1340 can commence as follows. In a charging initialization phase, switches S1 through S4 and D1 through D8 are opened. Counters 1 through 4 are reset to zero. Charge accumulator integrators 1 through 4 are initialized by circuits (not shown) with charge on capacitors C1 through C4 such that outputs V1 through V4 are at approximately +Vcc volts. The states of comparators A1c through A4c are measured and stored.

In a charging accumulation and measurement phase, the following steps can be performed. Switches D1 through D4 are closed, applying Vcc to the conductive touch surface of touch sensor 1310. If sensor 1310 has relatively low resistance among corners UR, UL, LL and LR, only one of the four switches (e.g., D1) is required. Switches D1 through D4 are opened, leaving sensor 1310 and any touch capacitance, if present, charged to Vcc. Switches S1, S2, S3 and S4 are closed simultaneously, allowing charge from each corner of sensor 1310 to accumulate in capacitors C1 through C4 of integrators 1, 2, 3 and 4. Switches S1, S2, S3 and S4 remain closed for a time period T (e.g., five time constants) to allow charge to transfer from sensor 1310 to integrator capacitors C1 through C4. Counters 1 through 4 are then incremented. The states of comparators A1c through A4c are measured. If any comparator(s) changed since the charging initialization phase, the value of its attached counter is stored and no further counting is performed until after the next initialization phase. Switches S1 through S4 are opened.

The above steps in the charging accumulation and measurement phase can be repeated, resulting in integrators 1 through 4 charging in a negative direction from Vcc. As each integrator output reaches the threshold of respective comparators, its attached comparator switches from one output state to another. Repetition continues until all four comparators' outputs have switched relative to their state at the end of the charging initialization phase. At this point, counters 1 through 4 have stored values representing the number of charge transfers required to bring each integrator to the threshold level. The charging values in the counters 1 through 4 are then stored.

Discharging occurs first through an initialization phase in which switches S1 through S4, and D1 through D8 are opened, and counters 1 through 4 are reset to zero. Integrators 1 through 4 are initialized by circuits (not shown) with charge on capacitors C1 through C4 such that outputs V1 through V4 are at approximately 0 volts. The states of comparators A1c through A4c are measured and stored.

In a discharging accumulation and measurement phase, the following steps can be performed. Switches D5 through D8 are closed, applying 0 V to the conductive touch surface of touch sensor 1310. If sensor 1310 has relatively low resistance from corner to corner, only one of the four switches (e.g., D5) is required. Switches D5 through D8 are opened, leaving sensor 1310 and any touch capacitance, if present, charged to 0 V. Switches S1, S2, S3 and S4 are closed simultaneously, allowing charge from each corner of sensor 1310 to accumulate in capacitors C1 through C4 of integrators 1 through 4. Switches S1, S2, S3 and S4 remain closed for a time period T (e.g., five time constants) to allow charge to transfer from sensor 1310 to integrator capacitors C1 through C4. Counters 1 through 4 are then incremented and the states of comparators A1c through A4c are measured. If any comparator(s) changed state since discharging initialization, the value of its attached counter is stored and no further counting is performed until after the next initialization phase. Switches S1 through S4 are opened.

The above discharging accumulation and measurement phase steps can be repeated, resulting in integrators 1 through 4 charging in a positive direction from 0 V. As each integrator output reaches the threshold of its respective comparator, its attached comparator switches. Repetition continues until all four comparators' outputs have switched relative to their state at the end of the discharging initialization phase. At this point, counters 1 through 4 have stored values representing the number of charge transfers required to bring each integrator to the threshold level. The discharging values in counters 1 through 4 are stored.

In a calculation phase, the four measured charging values and the four measured discharging values as determined in the steps outlined above can be combined to calculate the relative capacitance of the four corners UL, UR, LL and LR of sensor 1310. For example, the charging values can be summed with corresponding discharging values to yield four values inversely proportional to the capacitance at the four corners of sensor 1310. The four derived values can be filtered and used to calculate a touch position on sensor 1310, using known algorithms.

The foregoing description of the various embodiments of the invention has been presented for the purposes of illustration and description. It is not intended to be exhaustive or to limit the invention to the precise form disclosed. Many modifications and variations are possible in light of the above teaching. For example, the detection methodologies described herein may be used in connection with a wide variety of touch implements, including tethered implements and implements that house a battery or other power source. It is intended that the scope of the invention be limited not by this detailed description, but rather by the claims appended hereto.

I claim:

1. A method for measuring a capacitance on a plate comprising:
   accumulating a first signal representative of charge over a plurality of switch-controlled charging cycles during which fixed frequency positive voltages are applied to the plate;
   accumulating a second signal representative of charge over a plurality of switch-controlled discharging cycles during which fixed frequency negative voltages are applied to the plate; and
   in separate signal paths, processing the first and second signals and, in response, using the accumulated first and second signals, to determine the capacitance.

2. The method of claim 1, further comprising alternating the charging cycles and discharging cycles, isolating the signals in the signal paths, respectively, and processing the first and second signals nonlinearly by developing the accumulated first and second signals exponentially through circuitry that includes at least one resistive path.

3. The method of claim 1, further comprising using one or more sample integrators to accumulate the first and second signals.

4. The method of claim 3, wherein the first and second signals are accumulated by separate sample integrators.

5. The method of claim 4, further comprising repeating the accumulating steps multiple times, and wherein the separate sample integrators used to accumulate each of the first and second signals are alternated each time the accumulating steps are performed.

6. The method of claim 3, wherein the one or more sample integrators are one or more capacitors.

7. The method of claim 3, wherein the first and second signals are charges.

8. The method of claim 3, wherein the first and second signals are accumulated by the same sample integrator.

9. The method of claim 1, wherein the fixed frequency voltages applied to the plate result in a voltage waveform that is symmetric around a predetermined voltage over a period of time, independent of the capacitance being measured.

10. The method of claim 1, wherein each accumulating step includes a fixed number of cycles.

11. The method of claim 1, wherein each accumulating step is completed upon reaching a predetermined threshold of signal accumulation.

12. The method of claim 1, wherein the charging cycles and discharging cycles are controlled using the same switch.

13. The method of claim 1, wherein the charging cycles and discharging cycles are controlled using different switches.

14. The method of claim 1, wherein the plate comprises a conductive layer covering at least a portion of a touch sensitive area in a touch sensor.

15. The method of claim 1, wherein the plate comprises one of a plurality of elongated conductors disposed over a touch sensitive area in a touch sensor.

16. The method of claim 1, wherein accumulating the first signal occurs on a first capacitor and accumulating the second signal occurs on a second capacitor and further including
   accumulating, on the second capacitor, a third signal representative of a charge over a plurality of switch-controlled charging cycles during which fixed frequency positive voltages are applied to the plate;
   accumulating, on the first capacitor, a fourth signal representative of a charge over a plurality of switch-controlled charging cycles during which fixed frequency negative voltages are applied to the plate; and
   using the accumulated third and fourth signals to determine the capacitance.

17. The method of claim 1, wherein processing the first and second signals includes processing the first and second signals nonlinearly by developing the accumulated first and second signals exponentially by use of resistive circuitry.

18. The method of claim 1, further including processing the first and second signals nonlinearly by processing via signal compensation to account for the signal paths.

19. A method for measuring a capacitance on a plate comprising:
   accumulating a first signal representative of charge over a plurality of switch-controlled charging cycles during which fixed frequency positive voltages are applied to the plate;
   accumulating a second signal representative of charge over a plurality of switch-controlled discharging cycles during which fixed frequency negative voltages are applied to the plate;
   using the accumulated first and second signals to determine the capacitance; and completing the step of accumulating the first signal prior to beginning the step of accumulating the second signal.

20. A device for measuring capacitance on a plate comprising:
- two or more switches having open and closed states and disposed so that a first configuration of open and closed states of the two or more switches applies fixed frequency positive voltage pulses to the plate, and a second different configuration of open and closed states of the two or more switches applies a fixed frequency negative voltage pulses to the plate;
- control circuitry disposed to control the two or more switches;
- one or more signal accumulators disposed to accumulate and process using a first active circuit, a first signal representative of the capacitance to be measured during charging of the plate under the first configuration of open and closed states, and to accumulate and process using a second active circuit, a second signal representative of the capacitance to be measured during discharging of the plate under the second configuration of open and closed states; and
- measuring circuitry, responsive to the first and second active circuits, to determine the capacitance to be measured using the accumulated first signal and the accumulated second signal.

21. The device of claim 20, wherein the two or more switches comprise at least a charge switch and a discharge switch, the first configuration including opening the charge switch and opening the discharge switch, and the second configuration including opening the charge switch and closing the discharge switch.

22. The device of claim 20, wherein the one or more signal accumulators comprise one or more capacitors.

23. The device of claim 20, wherein the plate is an electrode in a capacitive touch sensing device.

24. A capacitive touch panel device comprising:
- at least one resistive element disposed in an active area of the touch panel;
- a plurality of pre-determined capacitance measurement points, each located on the at least one resistive element such that a touch input in the active area produces a capacitance on the at least one resistive element that can be proportionately measured at each of the plurality of pre-determined capacitance measurement points to determine the touch input location; and
- a plurality of capacitive measuring devices, each one of the plurality of capacitive measuring devices electrically connected to a different one of the plurality of pre-determined capacitance measurement points, wherein the capacitive measuring devices are each configured and arranged to measure a signal representative of capacitance at the respective capacitance measurement point under both charging and discharging conditions.

25. The capacitive touch sensor of claim 24, wherein the at least one resistive element is a single resistive layer that is continuous across the active area.

26. The capacitive touch sensor of claim 24, wherein the at least one resistive element comprises an electrically contiguous, segmented resistive layer that substantially covers the active area.

27. The capacitive touch sensor of claim 24, wherein the at least one resistive element comprises a plurality of individual sensing elements that together substantially cover the active area.

28. The capacitive touch sensor of claim 24, wherein the capacitive measuring devices are each configured and arranged, to sense active-circuit outputs respectively for charging and discharging conditions, to measure a signal representative of capacitance at the respective capacitance measurement point under both the charging and discharging conditions.

29. The capacitive touch sensor of claim 24, wherein the at least one resistive element includes one of the following:
- a single resistive layer that is continuous across the active area;
- an electrically contiguous, segmented resistive layer that substantially covers the active area; and
- a plurality of individual sensing elements that together substantially cover the active area.

* * * * *

UNITED STATES PATENT AND TRADEMARK OFFICE
CERTIFICATE OF CORRECTION

PATENT NO.       : 8,207,944 B2
APPLICATION NO.  : 11/612790
DATED            : June 26, 2012
INVENTOR(S)      : Bernard Geaghan Page 1 of 1

It is certified that error appears in the above-identified patent and that said Letters Patent is hereby corrected as shown below:

In the Specifications:

Column 8
Line 53; delete "C1" and insert -- C11 -- therefor.

Column 15
Line 11; delete "discharing" and insert -- discharging -- therefor.

Signed and Sealed this
Sixteenth Day of October, 2012

David J. Kappos
*Director of the United States Patent and Trademark Office*